(12) United States Patent
Rieple et al.

(10) Patent No.: US 11,662,009 B2
(45) Date of Patent: May 30, 2023

(54) MULTI-COMPONENT GEAR, GEAR AND PLANETARY GEARSET

(71) Applicant: IMS GEAR SE & Co. KGaA, Donaueschingen (DE)

(72) Inventors: Adrian Rieple, Huefingen (DE); Stephan Oberle, Villingen-Schwenningen (DE); Sebastian Birk, Trossingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 26 days.

(21) Appl. No.: 17/481,725

(22) Filed: Sep. 22, 2021

(65) Prior Publication Data
US 2022/0090668 A1 Mar. 24, 2022

(30) Foreign Application Priority Data
Sep. 24, 2020 (EP) ..................................... 20198218

(51) Int. Cl.
*F16H 55/06* (2006.01)
*F16H 55/17* (2006.01)

(52) U.S. Cl.
CPC ............. *F16H 55/06* (2013.01); *F16H 55/17* (2013.01); *F16H 2055/065* (2013.01)

(58) Field of Classification Search
CPC ..... F16H 55/06; F16H 55/17; F16H 2055/065
See application file for complete search history.

(56) References Cited

U.S. PATENT DOCUMENTS

| 3,200,665 | A | 8/1965 | Wells | |
| 6,875,113 | B2* | 4/2005 | Nichols | F16F 15/1442 474/94 |
| 9,205,611 | B2* | 12/2015 | Oolderink | B29C 37/0082 |
| 11,448,303 | B2* | 9/2022 | Kobayashi | F16H 55/06 |

(Continued)

FOREIGN PATENT DOCUMENTS

| DE | 10127224 A1 | 12/2002 |
| DE | 102014115804 B4 | 3/2017 |

(Continued)

OTHER PUBLICATIONS

Office Action dated Feb. 22, 2021 in corresponding application EP 20198218.8.

(Continued)

Primary Examiner — Terence Boes
(74) Attorney, Agent, or Firm — Nath, Goldberg & Meyer; Jerald L. Meyer

(57) ABSTRACT

The present invention relates to a multi-component gear (1) with an axis of rotation (X) and a first end face (11) and a second end face (12), having an inner part (20) and an outer part (30) made of a plastic with at least one injection-molding section (32), wherein the outer part (30) is arranged on an outer lateral surface (24) of the inner part (20) in a form-fitting and/or integral manner on the inner part (20), and wherein the outer part (30) on the first and/or the second end face (11, 12) has at least one tab (40) which is free-standing in the circumferential direction around the axis of rotation (X) and which protrudes over the relevant end face (11, 12) of the inner part (20). The present invention also relates to a gear (2) and a planetary gearset (3).

19 Claims, 9 Drawing Sheets

(56) References Cited

U.S. PATENT DOCUMENTS

| | | | | |
|---|---|---|---|---|
| 2010/0320025 A1* | 12/2010 | Beyerlein | ............... | F16H 55/22 |
| | | | | 74/411 |
| 2014/0339011 A1* | 11/2014 | Beyerlein | ............... | B23P 15/14 |
| | | | | 180/444 |
| 2015/0308555 A1* | 10/2015 | Oberle | .................... | F16H 55/17 |
| | | | | 74/421 R |
| 2021/0095751 A1* | 4/2021 | Stoppel | .................. | B29D 15/00 |
| 2021/0180675 A1* | 6/2021 | Bartolomeo | ........... | B33Y 70/00 |

FOREIGN PATENT DOCUMENTS

| | | |
|---|---|---|
| DE | 102018209668 A1 | 12/2019 |
| JP | 2003021223 A | 1/2003 |
| JP | 2009541679 A | 11/2009 |

OTHER PUBLICATIONS

Office Action dated Feb. 20, 2023 corresponding to Korean patent application No. 10-2021-0077297.

\* cited by examiner

MULTI-COMPONENT GEAR, GEAR AND PLANETARY GEARSET

The present invention relates to a multi-component gear with the features of claim 1, a gear, in particular a planet gear, with the features of claim 19, and a planetary gearset with the features of claim 20.

Multi-component gears are known from prior art in different configurations and are used, for example, for gears or planet gears in power-split transmissions. In the case of such components, an inner part, preferably made of metal, is initially provided as an insert and, in a subsequent manufacturing step, is encapsulated with a plastic to form the multi-component gear. For this purpose, the inner part is inserted into an injection mold and then liquefied plastic is introduced into the injection mold via at least one injection-molding section.

By overmolding the inner part with the plastic, a form-fitting and/or integral connection is brought about between the outer part and the inner part. In prior art, the outer part is not only molded onto an outer lateral surface of the inner part, but the two end faces of the inner part are also overmolded in some areas to form an axial lock in order to form an axial lock for the outer ring on the inner part.

In order to avoid great wall thicknesses and the associated formation of cavities, homogeneous plastic wall thicknesses must be implemented in the outer part.

In prior art, constant plastic wall thicknesses are achieved in the outer part by adapting relevant plastic diameters. These relevant plastic diameters are, for example, the outer diameter of a wheel and the root diameter of the toothing for a gear. The relevant plastic diameter must either be dimensioned sufficiently large so that a circumferential groove can be made on both sides in the end faces of the outer part, or the relevant plastic diameter must be reduced until the outer part can be designed in a ring shape with a constant plastic wall thickness on the inner part.

It has been found to be disadvantageous that the reduced plastic wall thicknesses prevent the formation of cavities, but on the other hand these promote the formation of stress cracks due to internal stresses. In addition, it has proven to be disadvantageous that the multi-component gears known from prior art or their outer part only have a low deformability in the axial direction and/or the radial direction and unfavorable stress conditions therefore often arise, which lead to stress cracking and encourage component failure resulting from the same.

This is where the present invention begins.

It is therefore the object of the present invention to provide an improved multi-component gear which advantageously improves the multi-component gears known from prior art. The improved multi-component gear should on the one hand avoid the formation of cavities due to great wall thicknesses and on the other hand the formation of stress cracks due to high internal stresses and have increased deformability in the axial and/or radial direction.

These objects are achieved by a multi-component gear with the features of claim 1, by a gear, in particular a planet gear, with the features of claim 19 and by a planetary gearset with the features of claim 20.

Further advantageous embodiments of the invention are specified in the dependent claims.

The multi-component gear according to the invention with the features of claim 1 has an axis of rotation, a first end face and a second end face. In addition, the multi-component gear comprises an inner part and an outer part, which is made of a plastic and has at least one injection-molding section, wherein the outer part is arranged on an outer lateral surface of the inner part in a form-fitting and/or integral manner on the inner part, and wherein the outer part on the first and/or the second end face has at least one tab which is free-standing in the circumferential direction around the axis of rotation and which protrudes over the relevant end face of the inner part. The present invention is thus based on the idea of realizing an axial support of the outer part on the inner part by at least one tab interrupted in the circumferential direction, which allows greater deformability, in particular in the axial direction, i.e., the axis of rotation.

According to the invention, the tab is understood to mean here and in the following a ridge which protrudes toward the axis of rotation, and which protrudes from an inner lateral surface of the outer part and protrudes at least in sections onto one of the end faces of the inner part. The inner lateral surface of the outer part has an inner diameter which corresponds approximately to the outer diameter of the outer lateral surface of the inner part.

In the context of this invention, an injection-molding section refers to a section in which at least one injection point, film gate, cone gate or the like is arranged. The injection-molding section is characterized by the fact that in manufacturing processes—such as injection molding, for example—it is where liquefied material is fed into the mold and from there is distributed in a cavity whose shape corresponds substantially to the subsequent workpiece. From the at least one injection-molding section, the liquefied material is preferably distributed evenly in the cavity, with several injection-molding sections being present, for example, or, in the case of annular cavities, the liquefied material coming together from several flow directions and a so-called weld line being created in this area.

It should also be noted that a form-fitting and/or integral connection between the outer part and the inner part can also be understood here and in the following as an approximately backlash-free shaft-hub connection between the inner part and the outer part, which can be formed between the inner part and the outer part to transmit a torque. However, the shaft-hub connection between the inner part and the outer part does not necessarily have to be configured to transmit a torque. This can be the case, for example, when—as will be explained below—the inner part is a roller bearing.

An advantageous development of the present invention provides that the outer part has a toothed ring. The toothed ring can be provided with any toothing to form a spur gear, a bevel gear, or the like.

It is also advantageous if more than one tab is provided in the circumferential direction around the axis of rotation on the first end face and/or the second end face. The tabs are preferably arranged symmetrically in the circumferential direction around the axis of rotation.

According to a further advantageous embodiment of the present invention, the number of tabs in the circumferential direction on the first end face and/or the second end face can also be the same. The number of tabs in the circumferential direction on the first end face and/or the second end face can be selected as desired.

According to a further advantageous embodiment of the present invention, the number of tabs in the circumferential direction on the first end face and/or the second end face is adapted to the number of injection-molding sections. In the event that the number of tabs in the circumferential direction on the first end face and/or the second end face corresponds to the number of injection-molding sections, a symmetrical distribution of the tabs in the circumferential direction on the first end face and/or the second end face between the weld lines and the injection-molding sections can be realized.

According to a further advantageous embodiment of the present invention, the at least one tab protrudes from a flange set back from the first end face and/or the second end face. The set-back flange is preferably arranged centrally between the first end face and the second end face and, in a preferred embodiment, can also have a shape that tapers in the direction of the axis of rotation. The flange can also be arranged eccentrically between the first end face and the second end face. An eccentric arrangement could be advantageous, for example, in the case of helical teeth on the outer part.

The flange extends at a distance from the relevant end face from a radially outer edge to a radially further inner edge, wherein a distance between the two outer edges can be greater than a distance between the two inner edges. Furthermore, it is preferred if the distance between the first end face and/or the distance between the second end face and the set-back flange is approximately at least a quarter of the distance between the first end face and the second end face.

According to a further preferred embodiment of the present invention, the at least one tab is formed by at least one free-standing L-shaped tongue, wherein according to a particularly preferred embodiment of the present invention, each at least one free-standing L-shaped tongue protrudes from the set-back flange. The at least one L-shaped tongue can have a first section and a second section, the first section being directly connected to the set-back flange and the second section pointing inward in the radial direction and forming the at least one tab. In other words, in this preferred embodiment, the first section is aligned approximately parallel to the axis of rotation or the lateral surface of the inner part, while the second section is arranged parallel to the first end face and/or the second end face. Compared to a conventional tab, the L-shaped tongue can—provided that identical materials are used—experience greater deformation without critical stress peaks being reached.

According to a further development of the invention, it is provided that the at least one tab and/or the set-back flange has at least one cut-out. The at least one cut-out is intended to improve the deformability of the particular tab and consequently reduce the axial shrinkage stresses. The cut-out can, for example, break through the particular tab, as a result of which the tab can be U-shaped or curved. The at least one cut-out can furthermore not only be formed in the at least one tab, but also, for example, in the set-back flange and weaken this in the region of the tab, or even completely break through it. The at least one cut-out can also form the at least one tab or the L-shaped tongue with multiple tongues. Each tab thus has several tongues with a first and a second section, preferably only a second section, which is arranged sporadically parallel to the first end face and/or the second end face and can axially fix or encompass the inner part.

According to a further advantageous embodiment of the present invention, the at least one tab protrudes from a recess, the recess extending in the direction of the axis of rotation, viewed in the radial direction, preferably U-shaped around the at least one tab. The recess is preferably designed in such a way that the effective length of the tab is increased in order to enable the greatest possible deflection of the free end of the tab without critical stress peaks being reached. In the event that the at least one tab is designed as an L-shaped tongue, the recess—viewed in the direction of the axis of rotation—is designed in any shape around the tab and can be incorporated or molded into the set-back flange. The two open ends of the recess can lie on the inner lateral surface. It can be preferred that the recess ends in alignment with the inner edge, starting from the relevant end face in the direction of the axis of rotation.

Another advantageous embodiment of the present invention provides that at least one pocket is provided in the outer part, which connects the first end face and the inner lateral surface of the outer part and/or connects the second end face and the inner lateral surface of the outer part. The at least one pocket locally reduces the effective wall thickness of the plastic, as a result of which the risk of cavity formation is reduced.

Furthermore, it has proven to be advantageous if the at least one pocket exposes the outer lateral surface of the inner part in some areas. The pocket consequently extends in areas parallel to the axis of rotation over or above the outer lateral surface of the inner part, whereby the contact area between the outer lateral surface of the inner part and the inner lateral surface of the outer part is reduced. The pocket preferably extends starting from the relevant end face of the inner part in the direction of the relevant other end face over at least 1% and a maximum of 50% of a width of the inner part, measured parallel to the axis of rotation. With an asymmetrical collar arrangement, the pocket can extend, starting from the relevant end face of the inner part, in the direction of the relevant other end face, over up to 90% of a width of the inner part, measured parallel to the axis of rotation.

Furthermore, it has proven to be advantageous if the number of tabs on the first end face and/or on the second end face are the same, and/or that the number of pockets on the first end face and/or the number of pockets on the second end face are the same.

It has also proven to be advantageous if the at least one tab on the first end face or the second end face and the at least one tab on the relevant other end face are aligned with one another in the circumferential direction in the direction of the axis of rotation. The position of each tab is related to its center point in the circumferential direction, the tabs on the first end face and/or the tabs on the second end face preferably being identical.

An advantageous further development of the invention provides that the at least one pocket on the first end face and/or the second end face is arranged in the circumferential direction in alignment with the at least one tab on the relevant other end face. This measure allows the longitudinal shrinkage during the hardening of the plastic after the injection molding to be better compensated, as a result of which any residual stresses can be weakened. This measure also reduces the plastic wall thickness and reduces the formation of cavities.

The at least one pocket is advantageously arranged in the circumferential direction in a free area between two tabs that are adjacent and free-standing in the circumferential direction, the pocket being arranged centrally in the free area in the circumferential direction according to a preferred embodiment. The pocket can either extend over the entire free area or only partially over the free area, the pocket preferably extending in the circumferential direction around the axis of rotation at a radian measure which is dimensioned to be the same as a radian measure of the at least one free-standing tab.

In addition, it has proven to be advantageous if at least one weld line is formed in the outer part, and if the at least one tab is arranged at a distance from the at least one weld line in the circumferential direction. The at least one weld line arises for technical reasons in the manufacturing process and leads to a potential weak point in the outer part. Since high stress peaks in particular are to be expected in the edge region of the at least one tab when the multi-component gear according to the invention is later used, it is advisable to arrange the at least one tab in such a way that it is arranged between the at least one weld line and the at least one injection-molding section.

A particularly preferred embodiment of the present invention provides that the inner part forms a shaft, a roller bearing or a sliding bearing, the roller bearing preferably being designed as a ball bearing. The roller bearing has an inner ring and an outer ring, the outer part being applied to the outer ring of the roller bearing in a form-fitting and/or integral manner by overmolding. The inner part or the roller bearing thus forms an insert.

Provided that the inner part is a roller bearing, when overmolding the inner part to form the outer part, the first end face and the second end face of the inner part are covered in such a way that the rolling elements of the roller bearing are not overmolded during injection molding. In this embodiment, the shaft-hub connection between the inner part and the outer part does not have to transmit any torque or any significant torque.

The outer lateral surface of the inner part can be a turned and/or ground circular cylindrical lateral surface and can have a mean roughness value Ra of less than Ra=32 μm, preferably less than Ra=16 μm.

Furthermore, it has proven to be advantageous if the at least one tab of the outer part projects beyond the first end face or the second end face by at least 0.5 mm. The at least one tab preferably protrudes no more than 50% over the relevant end face of the inner part or not over the outer ring of the inner part.

Another aspect of the present invention relates to a gear, in particular a planet gear, the gear having an axis of rotation, a first end face and a second end face. In addition, the gear has an inner part and an outer part formed from a plastic with at least one injection-molding section, the outer part being arranged on an outer lateral surface of the inner part in a form-fitting and/or integral manner on the inner part. According to the invention it is provided that the outer part on the first end face and/or the second end face has at least one tab which is free-standing in the circumferential direction around the axis of rotation and protrudes over the relevant end face of the inner part, as a result of which the outer part is fixed on the inner part in at least one direction of the axis of rotation on the outer part.

A preferred development of the gear according to the invention provides that the inner part forms a shaft, a roller bearing or a sliding bearing, the inner part preferably being designed as a ball bearing with an inner ring and an outer ring. Provided that the inner part is a ball bearing, the shaft-hub connection between the inner part and the outer part does not have to transmit any torque or any significant torque.

A third aspect of the present invention relates to a planetary gearset having at least one toothed wheel according to the invention, in particular a planet gear.

Seven exemplary embodiments of a multi-component gear according to the invention are described below with reference to the accompanying drawings. In the drawings.

Identical or functionally identical components are identified below with the same reference symbols. For the sake of clarity, not all identical or functionally identical parts are provided with a reference number in the individual figures.

Figure 1:
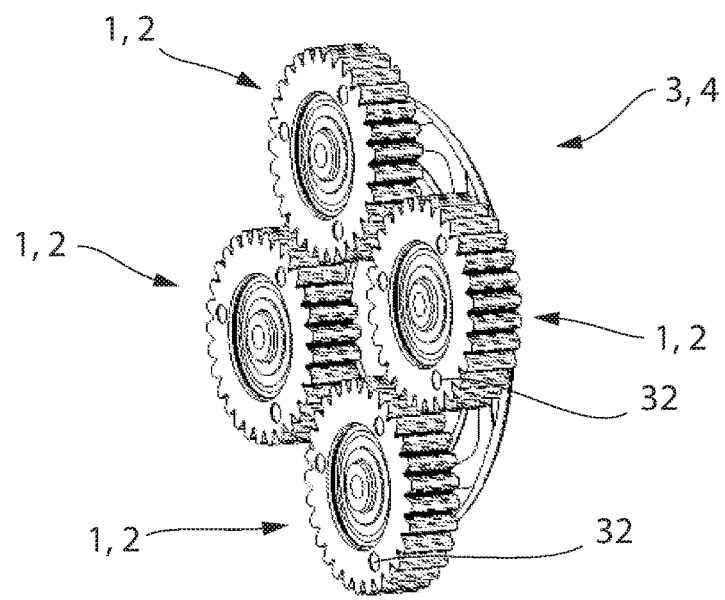
FIG. 1 is a perspective view of a planet carrier of a planetary gearset with four planet gears designed as a multi-component gear.

FIG. 1 shows a planet carrier 4 of a planetary gearset 3, which is not shown in full, having four multi-component gears 1, which are designed as planet gears 2 with a toothed ring 35.

Figure 2:
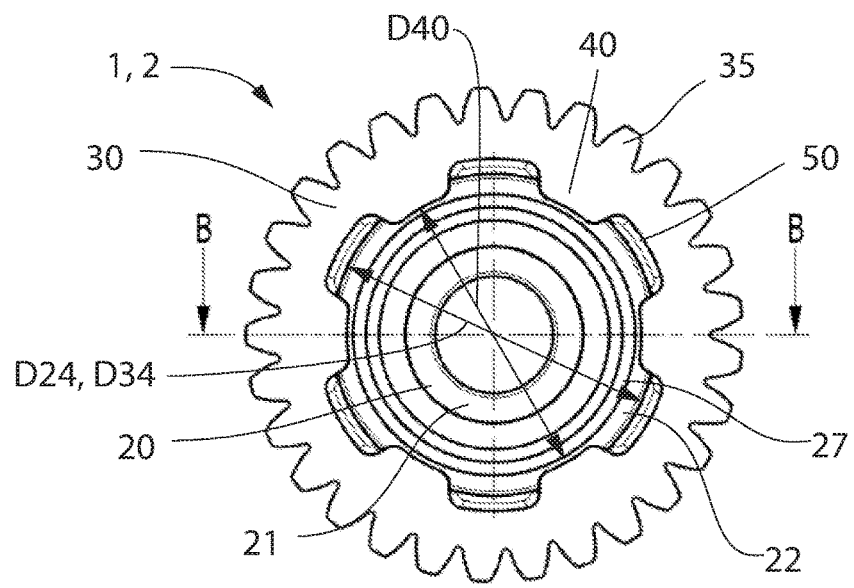
FIG. 2 is a front view of a multi-component gear according to FIG. 1.
Figure 3:
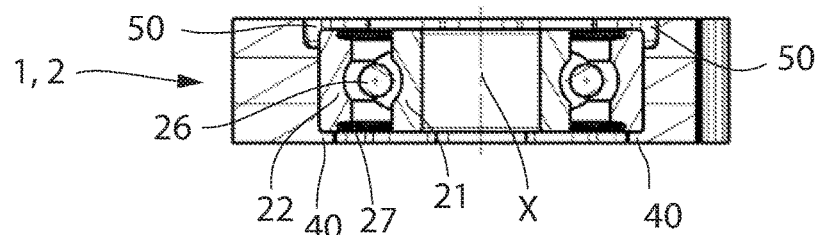
FIG. 3 is a sectional view of the multi-component gear according to the section line B-B in FIG. 2.
Figure 4:
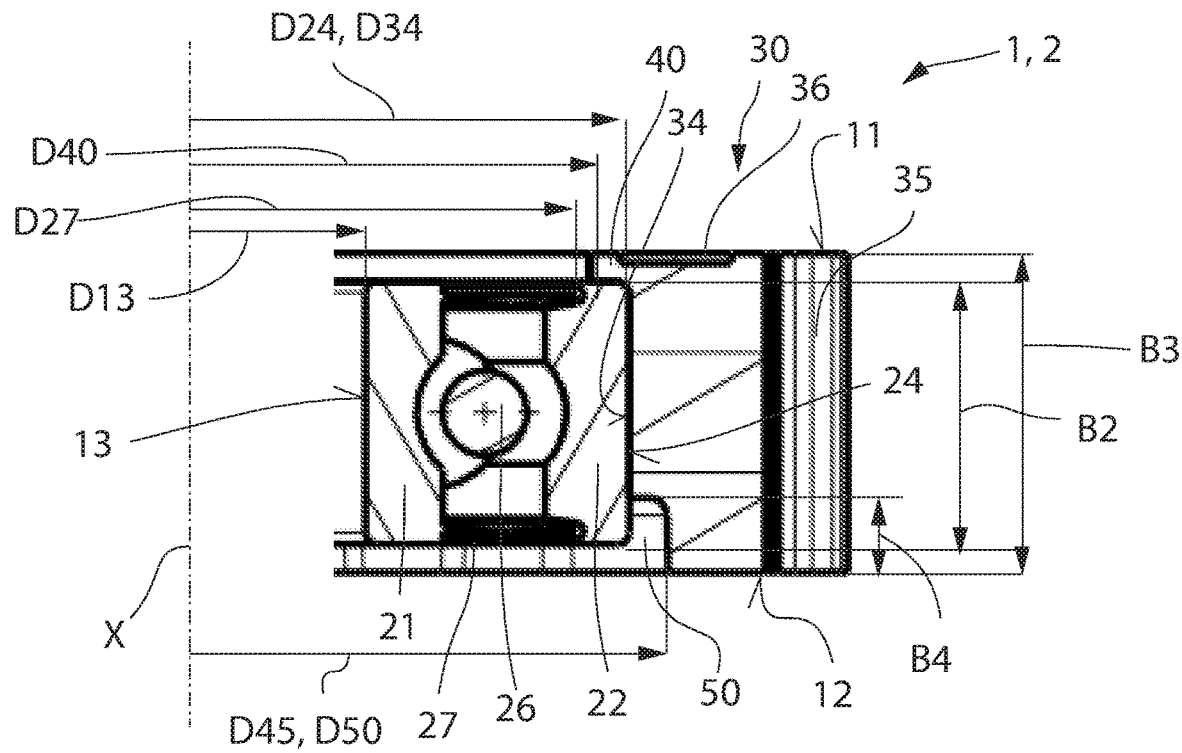
FIG. 4 shows a detailed illustration of the sectional illustration according to FIG. 3.

A first exemplary embodiment of the multi-component gear 1 is shown in FIGS. 2 to 4 and it can be seen that the multi-component gear 1 comprises an inner part 20 and an outer part 30. The multi-component gear 1 has an axis of rotation X which approximately forms an axis of symmetry of the multi-component gear 1 and with which the inner part 20 and the outer part 30 are arranged coaxially.

The multi-component gear 1 can be cylindrical or hollow-cylindrical and can furthermore form a hub on an inner lateral surface 13. The multi-component gear 1 has a first end face 11 and a second end face 12, which are arranged parallel in the axis of rotation X and spaced apart on two diametrical sides.

The inner part 20 is circular with a width $B_2$ and can be made of any material. In the exemplary embodiment shown, the inner part 20 is a conventional ball bearing with an inner ring 21, an outer ring 22, several rolling elements 26 and two sealing disks 27. The inner part 20 has an inner diameter $D_{13}$, in which an inner lateral surface 13 lies, and an outer diameter $D_{24}$, on which an outer lateral surface 24 is arranged as a cylinder lateral surface. The outer lateral surface 24 is preferably a turned or ground surface and preferably has an average roughness value of Ra≤32 µm.

The outer part 30 is preferably sprayed onto the inner part 20 in an injection molding process, the inner part 20 being overmolded as an insert. As a result of the method, the outer part 30 thus has at least one injection-molding section 32, which is preferably formed on at least one of the end faces 11, 12. The outer part 30 is preferably made of a plastic and, during the overmolding, is arranged both on the outer lateral surface 24 of the inner part 20 and—as will be explained below—on the end faces 11, 12.

The outer part 30 is substantially ring-shaped with a width B3 and is aligned coaxially with the inner part 20. The outer part 30 of the multi-component gear 1 can—as shown in the exemplary embodiments according to FIGS. 1 to 8—have the toothed ring 35 with any tooth shape. The width B3 of the outer part 30 is greater than the width B2 of the inner part 20.

On the first end face 11 and on the second end face 12, the outer part 30 has in each case six tabs 40, which are free-standing in a circumferential direction around the axis of rotation X and protrude radially inward in the direction of the axis of rotation X and in some areas onto the end faces of the inner part 20 to form a axial lock.

The tabs 40 are formed together with the outer part 30 during injection molding, whereby the tabs 40 and the outer part 30 are formed from a single piece.

According to a further development (not shown), the width B3 of the outer part 30 can also be smaller or greater than the width B2 of the inner part 20 or can also have the same dimensions. In this development, the tabs 40 can project beyond the first end face 11 and/or the second end face 12 in the direction of the axis of rotation X.

As can be seen in particular from FIG. 4, the tabs 40 project radially inward, starting from the inner diameter $D_{34}$ of the outer part 30 or the outer diameter $D_{24}$ of the inner part 20. Furthermore, it can be seen from FIGS. 3 and 4 that the tabs 40 on the first end face 11 and the second end face 12 are in alignment with the end faces of the outer part 30. The tabs 40 rest on the particular end face 11, 12 of the inner part 20.

In the radial direction, each tab 40 ends in a diameter $D_{40}$, which is smaller than the outer diameter $D_{24}$ of the inner part 20 and is greater than the inner diameter $D_{13}$ of the inner part. The diameter $D_{40}$ is preferably at least 1 mm smaller than the outer diameter $D_{24}$ of the inner part 20.

It can also be seen from FIG. 4 that the diameter $D_{40}$ is selected in such a way that the tabs 40 do not extend as far as the sealing disk 27 in order to prevent plastic from penetrating the roller bearing cage during the manufacturing process. Correspondingly, the diameter $D_{40}$ is at least as large as an outer diameter $D_{27}$ of the sealing disk 27, the diameter $D_{40}$ preferably being selected by an oversize of about 1 mm or greater than the outer diameter $D_{27}$ of the sealing disk 27 in order to enable suitable sealing measures for the rolling element during injection molding.

Between the tabs 40 on the first end face 11 and the second end face 12 a free area 45 is formed in each case, through which the free-standing tabs 40 are interrupted in the circumferential direction around the axis of rotation X. The free area 45 extends in the circumferential direction with a diameter $D_{45}$ which is at least as large as the outer diameter $D_{24}$ of the outer lateral surface 24 of the inner part 20, that is, $D_{45} \geq D_{24}$. In the circumferential direction, a transition area 42 is formed between the free area 45 and the tab 40, which is formed by several transition radii 43 to avoid sharp-edged transitions.

The tabs 40 extend in the circumferential direction by a radian measure of preferably approximately 30°, wherein the radian measure can be selected as desired.

The sectional views according to FIGS. 3 and 4 also show that the outer part 30 has a plurality of pockets 50 which are arranged in the circumferential direction both on the first end face 11 and on the second end face 12 between the tabs 40.

The pockets 50 extend in regions both over the relevant end face 11, 12 and over the inner lateral surface 34 of the outer part 30. For this purpose, the pockets 50 extend radially outward from the axis of rotation X up to a diameter $D_{50}$, which is greater than the inner diameter $D_{34}$ of the inner part 20. Each pocket 50 connects one end face 11, 12 to the inner lateral surface 34. In addition, it can be seen from FIG. 4 that the pockets 50 expose the outer lateral surface 24 of the inner part 20 in some areas, whereby the plastic wall thickness of the outer part 30 is reduced in the circumferential direction and thus counteracts possible cavity formation.

In relation to the width B2 (see FIG. 4), the pockets 50 expose at least 1 mm of the outer lateral surface 24 of the inner part 20, the pockets 50 preferably exposing the outer lateral surface 24 of the inner part 20 by a width B4, which is determined as follows: B4≈(B3−B2)/2. However, the maximum width B4 of each pocket 50 measured parallel to the axis of rotation X should not be more than 0.4*B2, that is to say, 40% of the width B2.

As shown in the illustrated embodiment, the pocket 50 can extend over the entire free area 45 in the circumferential direction. The diameter D50 of the pocket 50 and the diameter D45 of the free area can also have the same dimensions.

As can also be seen from FIGS. 3 and 4, the tabs 40 and the pockets 50 on the first end face 11 and the second end face 12 are offset from one another in such a way that, in the direction of the axis of rotation X, the tabs 40 on the first end face 11 are arranged in alignment with the pockets 50 on the second end face 12 (in each case based on their center point in the circumferential direction) and vice versa. This arrangement of the tabs 40 and pockets 50 offset in the circumferential direction makes it possible to reduce length shrinkage, as a result of which any residual stresses in the outer part 30 can be reduced.

Figure 5:
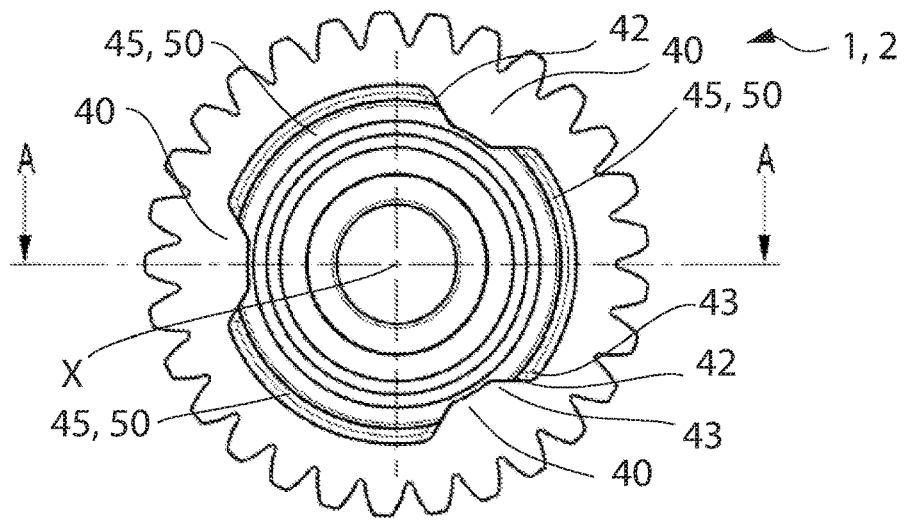
FIG. 5 is a front view of a second embodiment of a multi-component gear.
Figure 6:
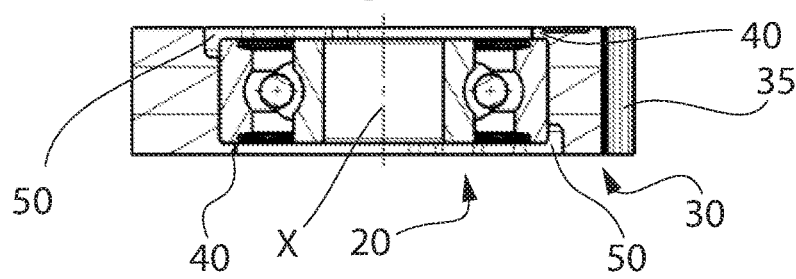
FIG. 6 shows a sectional view of the multi-component gear according to the section line A-A in FIG. 5.

A second exemplary embodiment is shown in FIGS. 5 and 6, the difference between the first exemplary embodiment and the second exemplary embodiment being that a different number of tabs 40 is provided.

FIG. 5 shows that three free-standing tabs 40 are arranged in the circumferential direction on the first end face 11, but also on the second end face 12. The three free-standing tabs 40 extend in the circumferential direction by a radian measure of approximately 30° and are arranged symmetrically at an angular division of 120°. The free area 45 between the tabs 40 is completely taken up by the pockets 50, as a result of which the pockets 50 extend in the circumferential direction by a radian measure of approx. 60° around the axis of rotation X.

As can be seen in particular from FIG. 6, analogously to the first exemplary embodiment, the tabs 40 on the first end face 11 and the pockets 50 on the second end face 12 and vice versa (each based on the center point in the circumferential direction) are arranged in alignment with one another in the direction of the axis of rotation X. The above-mentioned radian measures for the tabs 40 and the free area 45 can be varied as desired.

Figure 7:
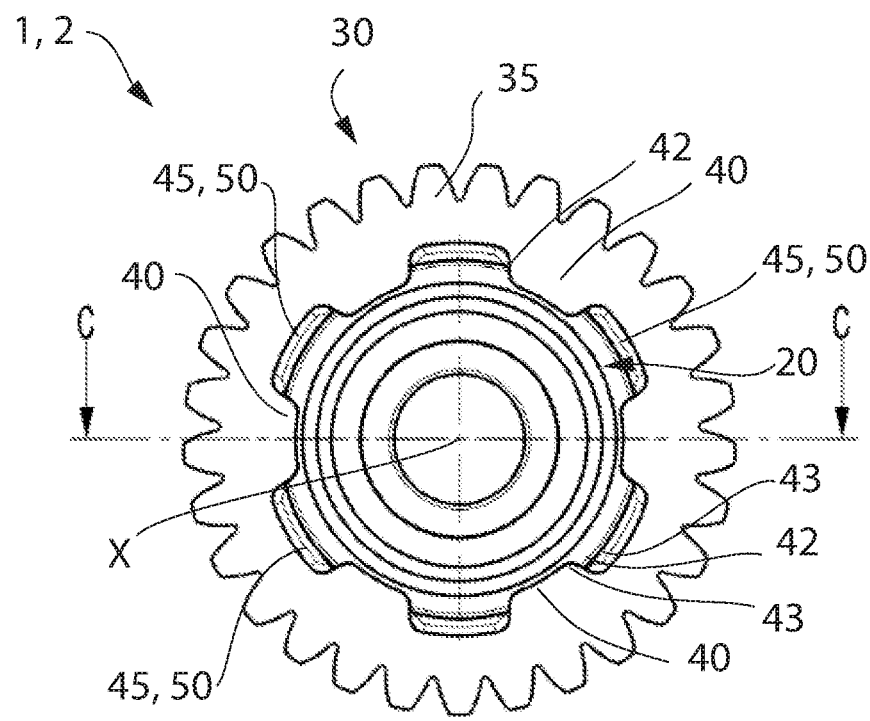
FIG. 7 is a front view of a third embodiment of the multi-component gear.
Figure 8:
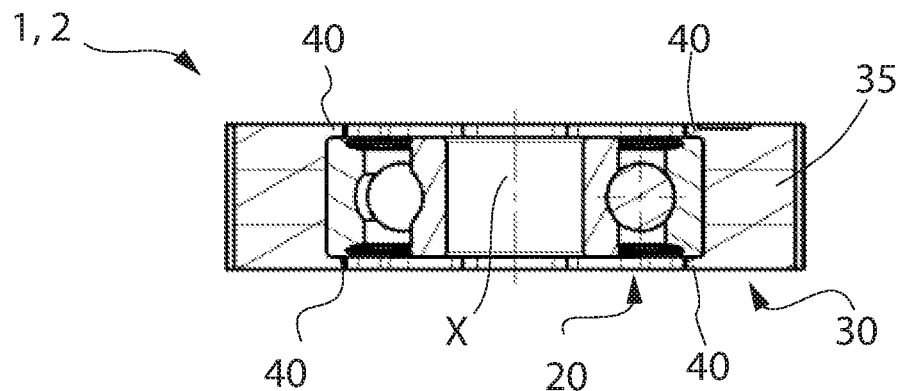
FIG. 8 shows a sectional view of the multi-component gear according to the section line C-C in FIG. 7.
Figure 9:
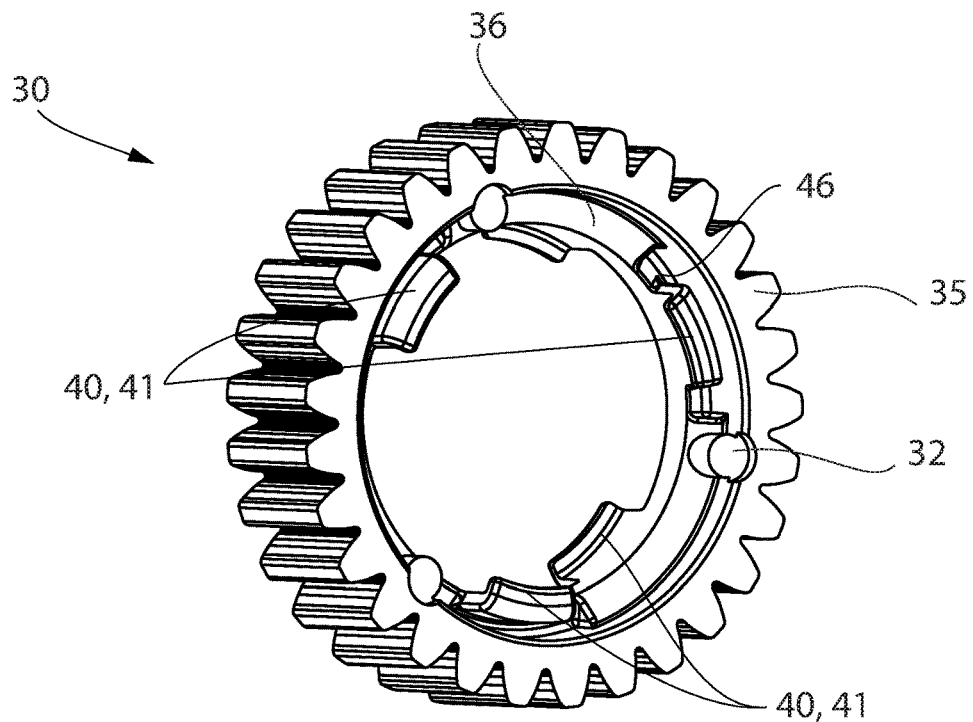
FIG. 9 is a perspective view of a fourth embodiment of the outer part of the multi-component gear according to FIG. 1.

The exemplary embodiment shown in FIGS. 7 and 8 differs from the exemplary embodiments presented above in that the tabs 40 on the first end face and the tabs 40 on the second end face 12 (based on the center point in the circumferential direction) are aligned with one another.

The fourth exemplary embodiment is shown in FIGS. 9-14. The outer part 30 is produced from a plastic, preferably by injection molding, and can—as shown—have three injection-molding sections 32 distributed symmetrically around the axis of rotation X in the circumferential direction. During the manufacturing process, liquefied plastic is introduced into a corresponding cavity (not shown) of a mold (not shown), the injection-molding sections 32 being formed where the plastic is injected into the cavity of the mold. The liquefied plastic is distributed in the cavity, the flow fronts meeting in the circumferential direction approximately between the injection-molding sections 32 and a so-called weld line 33, in which the flow fronts are welded. The position of the injection-molding sections 32 and of the weld line 33 can be seen in FIG. 10, the weld lines 33 being shown by means of a dash-dotted line for better understanding.

Figure 13:
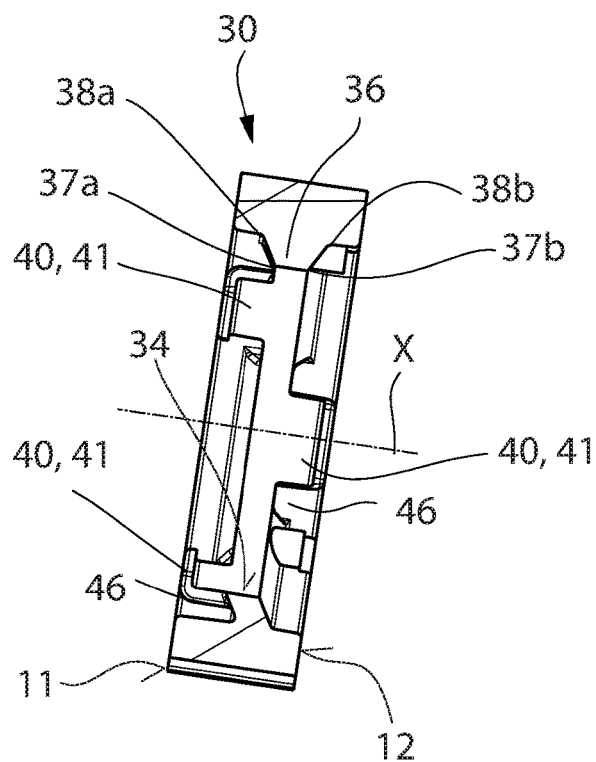
FIG. 13 shows a sectional illustration along the section line C-C according to FIG. 10.

The outer part 30 has a flange 36 set back from the first end face 11 and the second end face 12, the free end of which points to the axis of rotation X. In particular, FIG. 13 shows that the set-back flange 36 extends from a first outer edge 38a to a first inner edge 37a on the side facing the first end face 11 and from a second outer edge 38b to a second inner edge 37b on the side facing the second end face 12. The distance between the first outer edge 38a and the second outer edge 38b is greater than the distance between the first inner edge 37a and the second inner edge 37b.

The set-back flange 36 can have a tapering shape, wherein the set-back flange 36 can be designed to be increasingly tapered with a decreasing radius—in relation to the axis of rotation X. The tapering shape of the flange can be seen in FIG. 13. The free end of the set-back flange 36 forms the inner lateral surface 34, which can be in contact with the inner part 20.

A plurality of L-shaped tongues 41, which have a first section and a second section, protrude from the set-back flange 36. The first section is arranged approximately parallel to the axis of rotation X, while the second section is angled perpendicular to the first section and forms a tab 40, which is set up to protrude over the relevant end face 11, 12 of the inner part 20. As can be seen in particular from FIGS. 10 and 11, three L-shaped tongues 41 are arranged on each end face 11, 12, which are equidistantly spaced in the circumferential direction and each preferably forms a single tab 40. Each L-shaped tongue 41 can be arranged in such a way that it is arranged between an injection-molding section 32 and a weld line 33 spaced apart from the injection-molding section 32, preferably in the middle.

Figure 10:
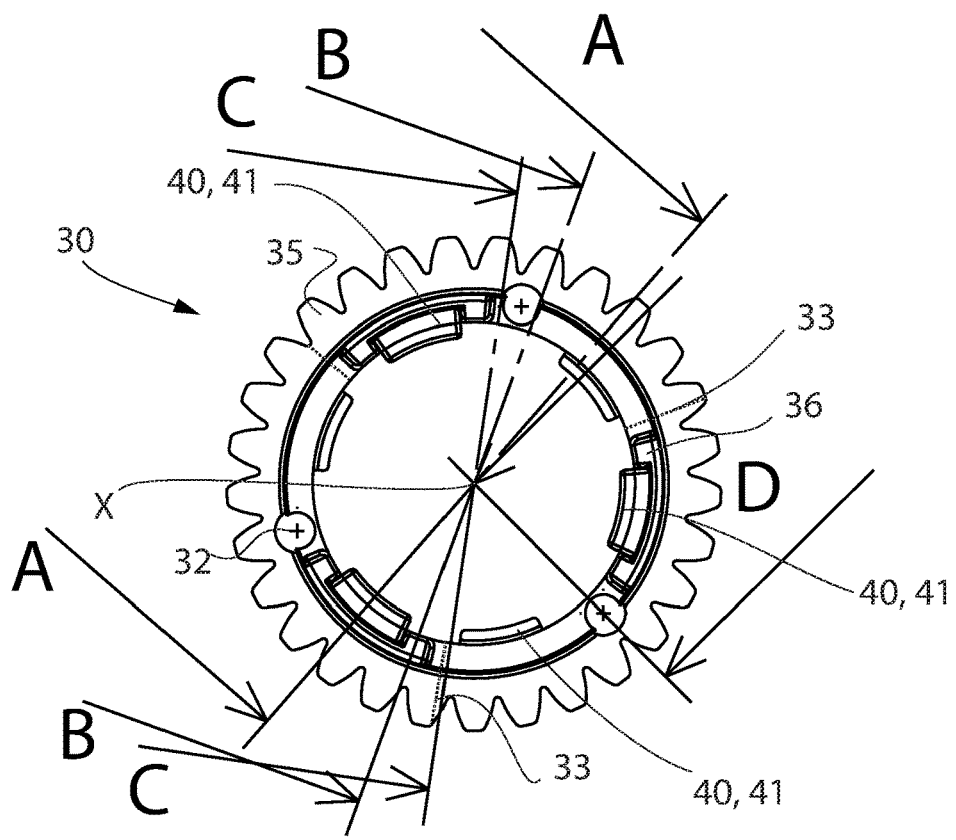
FIG. 10 is a front view of the outer part according to FIG. 9.

As can also be seen from FIG. 10, a U-shaped recess 46 is formed in the set-back flange 36 around each L-shaped tongue 41, by means of which the effective length of the first section of the L-shaped tongue 41 is extended and which enables the L-shaped tongue 41, or the free end forming the tab 40, to be deflected in a flexurally elastic manner.

Figure 11:
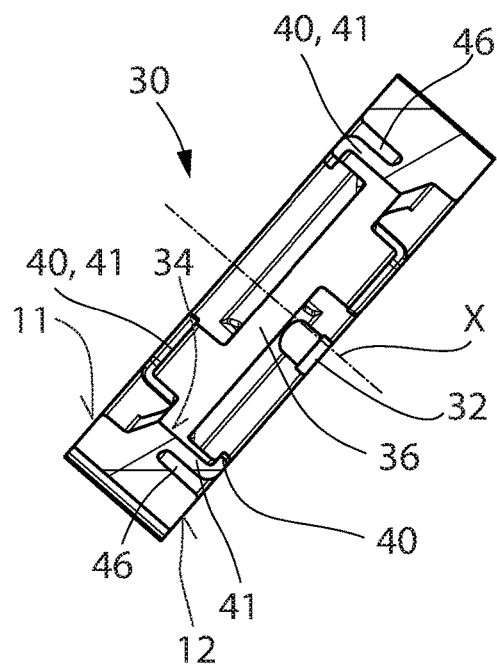
FIG. 11 shows a sectional illustration along the section line A-A according to FIG. 10.
Figure 12:
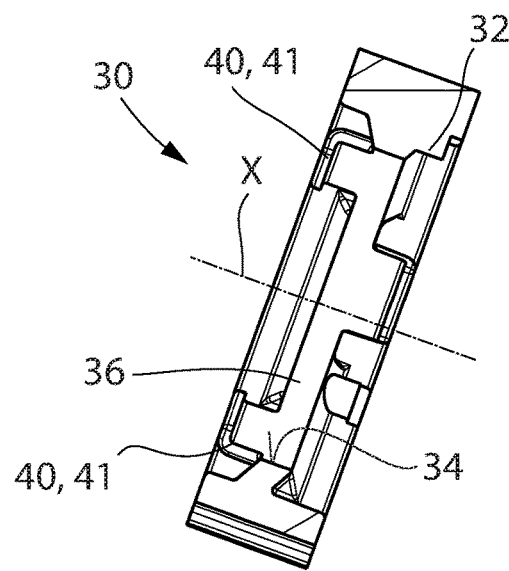
FIG. 12 shows a sectional illustration along the section line B-B according to FIG. 10.

The recess 46 extends, as shown in FIGS. 11 and 13, from the relevant outer edge 38a, 38b of the set-back flange 36 parallel to the axis of rotation X and ends in alignment with the inner edge 37a, 37b of the set-back flange 36.

Figure 14:
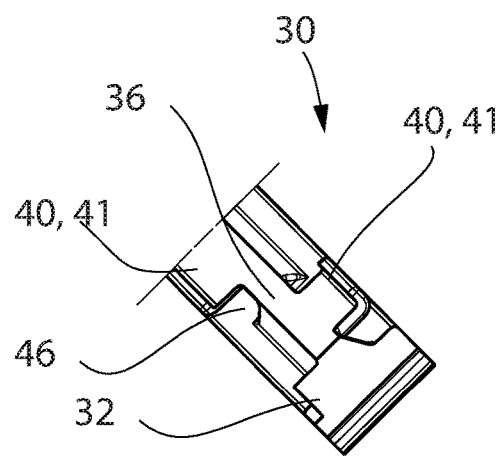
FIG. 14 shows a sectional illustration along the section line D-D according to FIG. 10.
Figure 15:
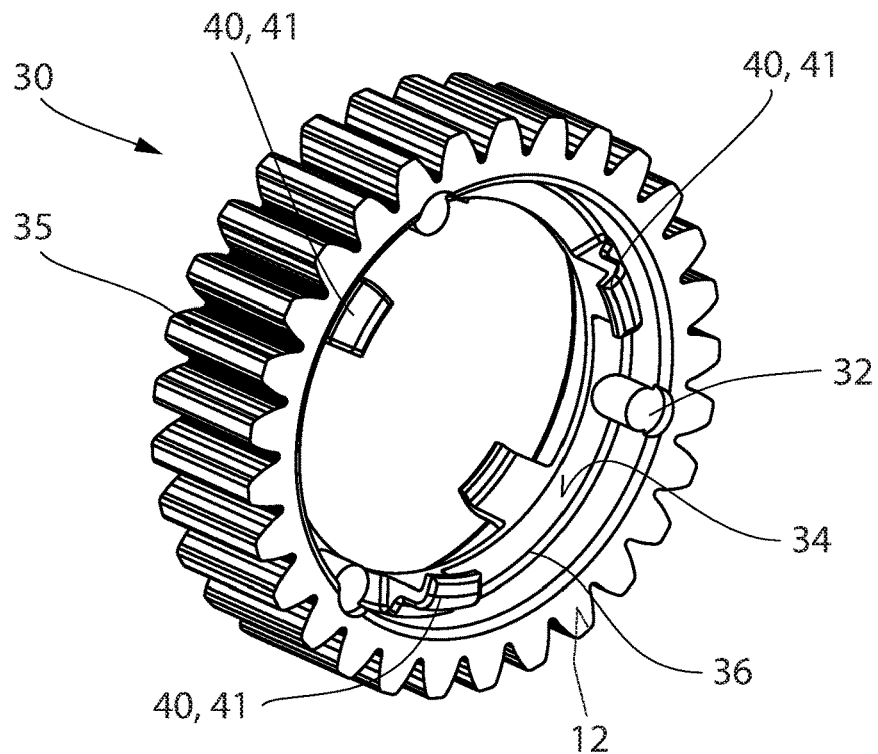
FIG. 15 is a perspective view of a fifth embodiment of the outer part of the multi-component gear according to FIG. 1.

The section D-D according to FIG. 10, shown in FIG. 14, shows a section through the injection-molding section 32 and it can be seen that, in the preferred embodiment, this is set back in relation to the end face 11, but protrudes beyond the set-back flange 36 in the direction of the axis of rotation X.

FIGS. 15-19 show an outer part 30 according to a fifth exemplary embodiment. The outer part 30 differs from the exemplary embodiment according to FIGS. 9-14 in the design of the set-back flange 36 and the connection between the L-shaped tongues 41 and the set-back flange 36.

The set-back flange 36 can have a tapering shape or be trapezoidal, wherein the set-back flange 36 can be made increasingly tapered with a decreasing radius—in relation to the axis of rotation X. The tapering shape of the flange can be seen in FIG. 17.

Alternatively, the set-back flange 36 can be cuboid, whereby a distance between the respective outer edges 38a, 38b and the respective inner edges 37a, 37b of the set-back flange 36 is equidistant.

Figure 16:
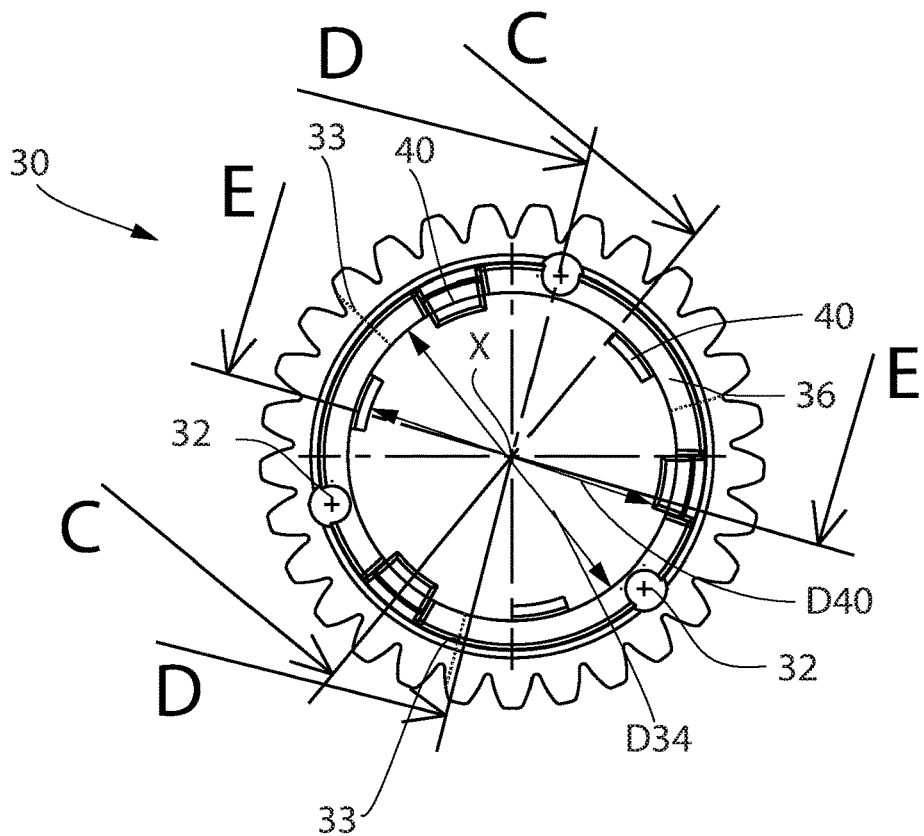
FIG. 16 is a front view of the outer part according to FIG. 15.
Figure 17:
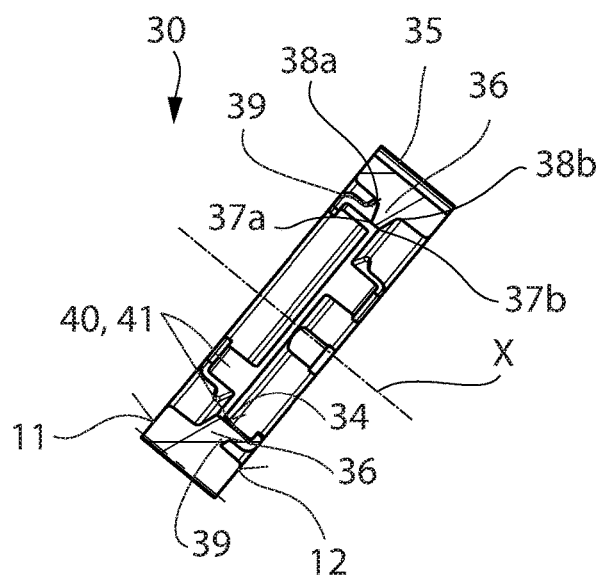
FIG. 17 shows a sectional illustration along the section line C-C according to FIG. 16.
Figure 18:
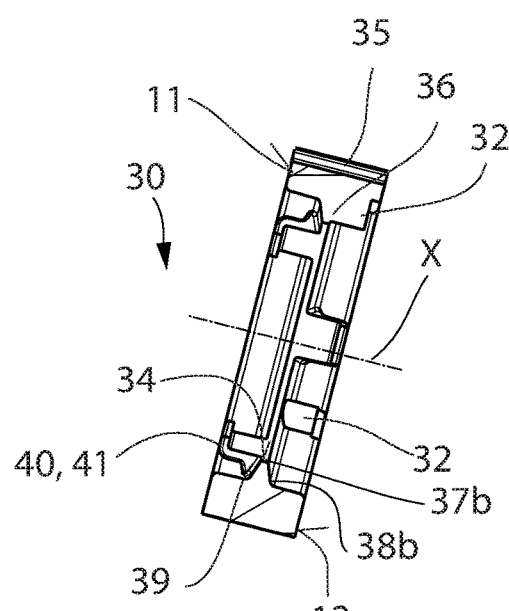
FIG. 18 shows a sectional illustration along the section line D-D according to FIG. 16.
Figure 19:
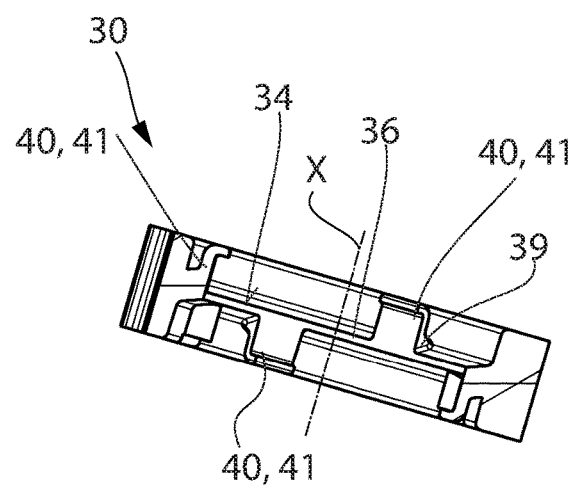
FIG. 19 shows a sectional illustration along the section line E-E according to FIG. 16.

As can be seen in particular from FIGS. 16 and 17, the L-shaped tongue 41 is connected to the set-back flange 36 via a shoulder 39. The L-shaped tongue 41 can be formed by a transition between the L-shaped tongue 41 and the set-back flange 36, which can be wedge-shaped, for example. The shoulder 39 is adapted to the shape of the set-back flange 36, whereby parallel to the axis of rotation X, a wall thickness of the shoulder and the flange (together) remain approximately constant and thus greater stresses can be reduced in the transition between the L-shaped tongue 41 and the circumferential and set-back flange 36.

Moreover, it can also be seen that 3 L-shaped tongues 41 are formed both on the first end face 11 and on the second end face 12, each of which forms a tab 40. The arrangement of the L-shaped tongues 41 or the tabs 40 can preferably be selected such that the L-shaped tongues 41 or the tabs 40—as shown—are angularly offset on opposite end faces 11, 12 and can also be arranged angularly offset to the injection-molding sections 32 and the weld lines 33.

Figure 20:
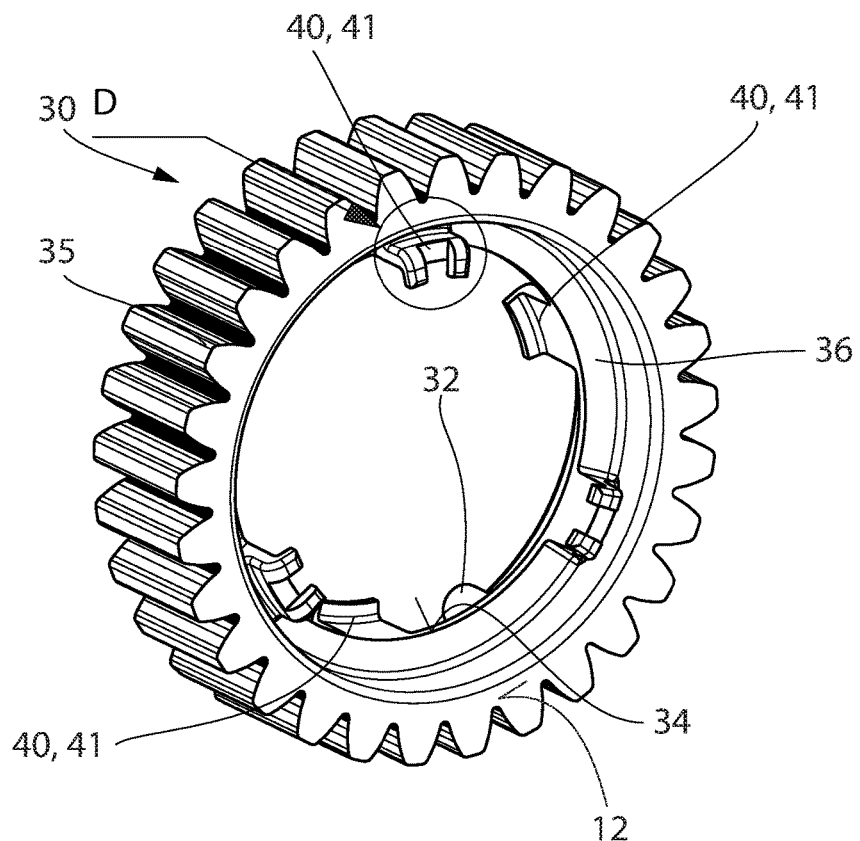
FIG. 20 shows a perspective illustration of a sixth exemplary embodiment, the tab having a cut-out.
Figure 21:
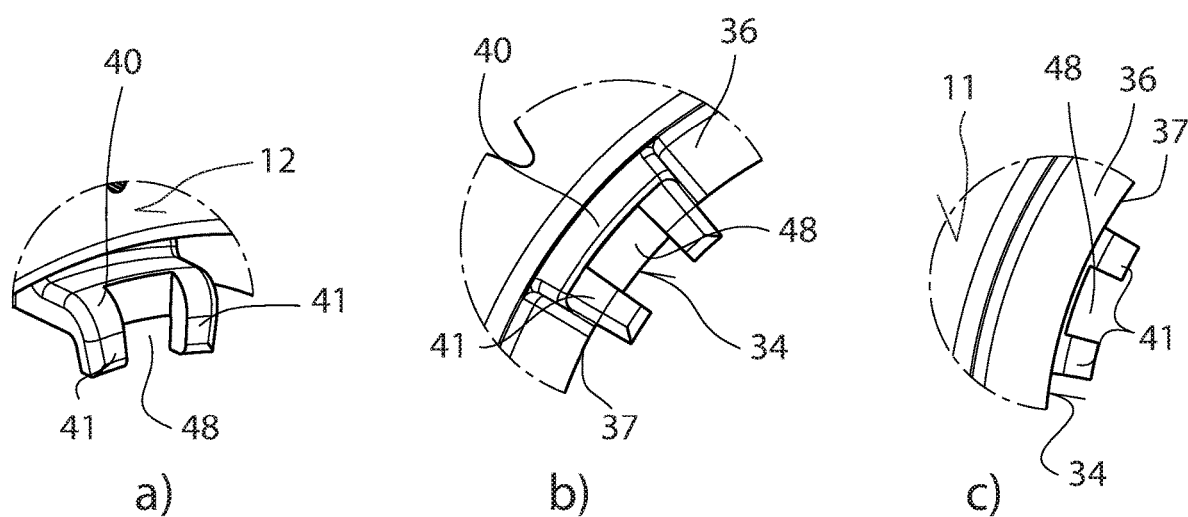
FIG. 21 shows a detailed representation of the tab according to FIG. 20.

FIGS. 20 to 21c show a fifth exemplary embodiment, the multi-component gear being designed approximately analogously to the exemplary embodiment shown in FIGS. 15-19. In contrast to the exemplary embodiment shown up to now, the tab 40 has a cut-out 48 which, as shown, can break through the tab in the middle in such a way that the second partial area of the tab 40 is formed with multiple tongues.

Each tab 40 or L-shaped tongue 41 protrudes in the axial direction from the set-back flange 36 and projects beyond the relevant end face 11, 12. The part of the tab 40 aligned in the axial direction corresponds to the first partial area, while the second partial area is aligned approximately radially or secantially and can encompass the end faces of the inner part 20. For this purpose, the tabs 40 protrude beyond the lateral surface 34, see FIGS. 21b and 21c.

FIGS. 20 and 21 show a sixth exemplary embodiment, the multi-component gear being designed approximately analogously to the exemplary embodiment shown in FIGS. 15-19. In contrast to the exemplary embodiments shown so far, the tab 40 has a cut-out 48 which, as shown, can break through the tab in the middle in such a way that the second partial area of the tab 40 is formed with multiple tongues.

Each tab 40 or L-shaped tongue 41 protrudes in the axial direction from the set-back flange 36 and projects beyond the relevant end face 11, 12. The part of the tab 40 aligned in the axial direction corresponds to the first partial area, while the second partial area is aligned approximately radially or secantially and can encompass the end faces of the inner part 20.

The cut-out 48 increases the axial deformability of the tabs 40 and at the same time reduces the axial shrinkage stresses. It should be noted at this point that each tab 40 can have a plurality of cut-outs 48, as a result of which the tab 40 can have a plurality of tongues 41.

Figure 22:
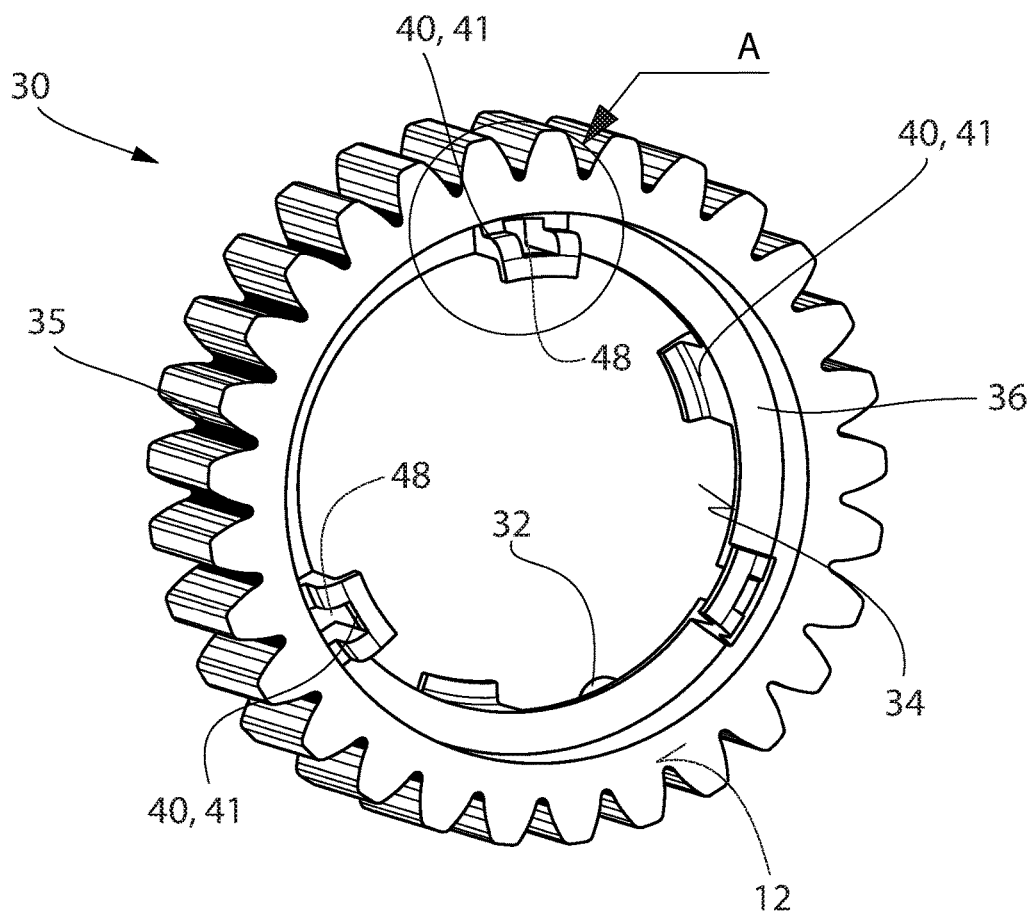
FIG. 22 shows a perspective illustration of a seventh exemplary embodiment.
Figure 23:
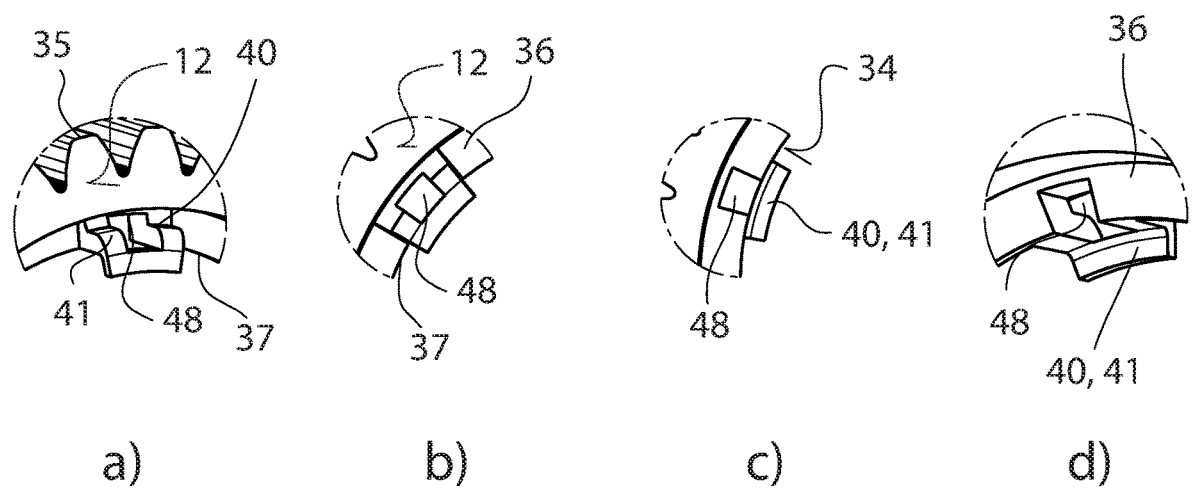
FIG. 23 shows a detailed representation according to FIG. 22.

With reference to FIGS. 22 to 23c, a seventh exemplary embodiment is shown, the cut-out 48 breaking through both the tab 40 and the set-back flange 36. In this exemplary embodiment, the tab 40 is U-shaped, the first partial area being formed in two or more parts and the second partial area connecting the ends of the first partial area. In the illustrated embodiment, the cut-out 48 extends in the shape of a cuboid parallel to the longitudinal axis through the tab 40 and through the set-back flange 36, which avoids an undercut in the second part and increases the deformability in the area of the tab 40 or reduces the rigidity there.

LIST OF REFERENCE NUMERALS

1 Multi-component gear
2 Planet gear
2 Gear
3 Planetary gearset
4 Planet carrier
11 First end face
12 Second end face
13 Lateral surface
20 Inner part
21 Inner ring
22 Outer ring
24 Lateral surface
26 Rolling element
27 Sealing disk
30 Outer part
32 Injection-molding section
33 Weld line
34 Lateral surface
35 Toothed ring
36 Flange
37 Inner edge
38 Outer edge
39 Shoulder
40 Tab
41 Tongue
42 Transition area
43 Transition radius
45 Free area
48 Cut-out
50 Pocket
B2 Width of 20
B3 Width of 30
B4 Width of 40
D13 Inner diameter of 13
D24 Outer diameter of 24
D27 Outer diameter of 27
D34 Inner diameter of 34
D40 Diameter of 40
D45 Inner diameter of 45
D50 Diameter of 50
X Axis of rotation

The invention claimed is:

1. A multi-component gear (1) with an axis of rotation (X) and a first end face (11) and a second end face (12), comprising:
an inner part (20), and
an outer part (30) made of a plastic with at least one injection-molding section (32),
wherein the outer part (30) is arranged on an outer lateral surface (24) of the inner part (20) in a form-fitting and/or integral manner on the inner part (20), and
wherein the outer part (30) on the first and/or the second end face (11, 12) has at least one tab (40) which is free-standing in the circumferential direction around the axis of rotation (X) and which protrudes over the relevant end face (11, 12) of the inner part characterized in that the at least one tab (40) protrudes from a recess (46) (20).

2. The multi-component gear (1) according to claim 1, characterized in that the outer part (30) has a toothed ring (35).

3. The multi-component gear (1) according to claim 1, characterized in that the tabs (40) are arranged symmetrically around the circumference.

4. The multi-component gear (1) according to claim 1, characterized in that the number of tabs (40) on the first and the second end face (11, 12) is the same.

5. The multi-component gear (1) according to claim 1, characterized in that the tabs (40) protrude from a flange (36) set back from the first and/or the second end face (11, 12).

6. The multi-component gear (1) according claim 1, characterized in that the at least one tab (40) is formed by a free-standing L-shaped tongue (41).

7. The multi-component gear (1) according to claim 1, characterized in that the at least one tab (40) has a cut-out (48).

8. The multi-component gear (1) according to claim 1, characterized in that at least one pocket (50) connecting the first end face (11) and the inner lateral surface of the outer part (30) and/or at least one pocket (50) connecting the second end face (12) and the inner lateral surface (34) of the outer part (30) is provided.

9. The multi-component gear (1) according to claim 8, characterized in that the at least one pocket (50) exposes the outer lateral surface (24) of the inner part (20) in some areas.

10. The multi-component gear (1) according to claim 8, characterized in that the number of tabs (40) on the first end face (11) and on the second end face (12) is the same and/or that the number of pockets (50) on the first end face (11) and on the second end face (12) is the same.

11. The multi-component gear (1) according to claim 8, characterized in that the at least one tab (40) on the first end face (11) and the at least one tab (40) on the second end face (12) are arranged in alignment with one another in the circumferential direction in the direction of the axis of rotation (X).

12. The multi-component gear (1) according to claim 9, characterized in that the at least one pocket (50) on the first end face (11) and/or the second end face (12) is aligned with the at least one tab (40) on the other end face (11, 12) in the circumferential direction in the direction of the axis of rotation (X).

13. The multi-component gear (1) according to claim 1, characterized in that the outer part (30) on the first and/or the second end face (11, 12) has two or more tabs (40) that are free-standing in the circumferential direction, and that between two adjacent tabs (40) a free area (45) is formed.

14. The multi-component gear (1) according to claim 1, characterized in that the at least one pocket (50) is arranged in the circumferential direction in the free area (45) and/or that the at least one pocket (50) is arranged over the entire free area (45).

15. A multi-component gear (1) with an axis of rotation (X) and a first end face (11) and a second end face (12), comprising: —an inner part (20), and —an outer part (30)

made of a plastic with at least one injection-molding section (32), —wherein the outer part (30) is arranged on an outer lateral surface (24) of the inner part (20) in a form-fitting and/or integral manner on the inner part (20), and —wherein the outer part (30) on the first and/or the second end face (11, 12) has at least one tab (40) which is free-standing in the circumferential direction around the axis of rotation (X) and which protrudes over the relevant end face (11, 12) of the inner part (20), wherein. at least one weld line (33) is formed and that the at least one tab (40) is arranged in the circumferential direction at a distance from the at least one weld line (33).

16. The multi-component gear (1) according to claim 1, characterized in that the inner part (20) is a shaft or a roller bearing with an inner ring (21) and an outer ring (22).

17. The multi-component gear (1) according to claim 1, characterized in that the at least one tab (40) of the outer part (30) protrudes by at least 0.5 mm in a radial direction onto the first end face (11) and/or the second end face (12) of the outer ring (22), but does not protrude beyond the outer ring (22) in the radial direction.

18. A gear (2), in particular a planet gear, formed from a multi-component gear (1) according to claim 1.

19. A planetary gearset (3) having at least one gear (2) with the features of claim 18.

* * * * *